US012683253B2

(12) United States Patent (10) Patent No.: US 12,683,253 B2
Bai et al. (45) Date of Patent: Jul. 14, 2026

(54) BATTERY MODULE AND ELECTRONIC DEVICE CONTAINING THE SAME

(71) Applicant: Ningde Amperex Technology Limited, Ningde (CN)

(72) Inventors: Xiaogong Bai, Dongguan (CN); Xianglong Han, Dongguan (CN); Ying Wang, Dongguan (CN)

(73) Assignee: Ningde Amperex Technology Limited, Ningde (CN)

( * ) Notice: Subject to any disclaimer, the term of this patent is extended or adjusted under 35 U.S.C. 154(b) by 663 days.

(21) Appl. No.: 18/192,913

(22) Filed: Mar. 30, 2023

(65) Prior Publication Data

US 2023/0238672 A1     Jul. 27, 2023

Related U.S. Application Data

(63) Continuation of application No. PCT/CN2021/082239, filed on Mar. 23, 2021.

(51) Int. Cl.
*H01M 50/578* (2021.01)
*H01M 50/209* (2021.01)
*H01M 50/383* (2021.01)
*H01M 50/519* (2021.01)

(52) U.S. Cl.
CPC ....... *H01M 50/578* (2021.01); *H01M 50/209* (2021.01); *H01M 50/383* (2021.01); *H01M 50/519* (2021.01)

(58) Field of Classification Search
CPC ............. H01M 50/578; H01M 50/209; H01M 50/383; H01M 50/519; H01M 10/425; H01M 50/204; H01M 50/242; H01M 50/284; H01M 50/581
See application file for complete search history.

(56) References Cited

U.S. PATENT DOCUMENTS

| | | | |
|---|---|---|---|
| 2019/0067672 A1 | 2/2019 | Park et al. | |
| 2020/0075926 A1* | 3/2020 | Torok ................... | H05K 7/1427 |
| 2024/0072399 A1* | 2/2024 | Berlureau ........... | H01M 50/521 |

FOREIGN PATENT DOCUMENTS

| | | |
|---|---|---|
| CN | 102160214 A | 8/2011 |
| CN | 104733685 A | 6/2015 |
| CN | 207624793 U | 7/2018 |
| CN | 110112341 A | 8/2019 |
| CN | 209561520 U | 10/2019 |
| CN | 210723203 U | 6/2020 |
| CN | 210897379 U | 6/2020 |
| CN | 210897427 U | 6/2020 |
| CN | 211125918 U | 7/2020 |

(Continued)

OTHER PUBLICATIONS

English Translation CN 104733685 A (Year: 2015).*

(Continued)

*Primary Examiner* — Stewart A Fraser
(74) *Attorney, Agent, or Firm* — Maier & Maier, PLLC

(57) ABSTRACT

A battery module includes a battery unit, a circuit board, and an expansion portion. The expansion portion is disposed between a first body and a second body and/or between a first tab and a second tab of the battery unit, and the expansion portion is configured to disconnect the first tab and/or the second tab from the circuit board.

18 Claims, 8 Drawing Sheets

(56)                  References Cited

FOREIGN PATENT DOCUMENTS

| JP | 2002008629 A | 1/2002 |
| JP | 2011181409 A | 9/2011 |

OTHER PUBLICATIONS

International Search Report issued on Dec. 29, 2021 in corresponding application No. PCT/CN2021/082239; 7 pgs.
Chinese Office Action issued on May 26, 2022 in corresponding application No. 202180002822.1; 17 pgs.

* cited by examiner

50

501

503

502

504

1

BATTERY MODULE AND ELECTRONIC DEVICE CONTAINING THE SAME

CROSS-REFERENCE TO RELATED APPLICATION

The present application is a continuation application of PCT Application Serial No. PCT/CN2021/082239, filed on Mar. 23, 2021, the content of which is incorporated by reference in its entirety.

TECHNICAL FIELD

This application relates to the technical field of batteries, and in particular, to a battery module and an electronic device containing the same.

BACKGROUND

Safety performance of a battery module is increasingly a matter of concern. When the battery module in use is abnormal, such as overcharged and short-circuited, the battery temperature rises exceptionally or the battery expands in volume exceptionally, resulting in a considerable safety risk of the battery module.

SUMMARY

In view of the situation described above, this application provides a battery module to solve at least one of the technical problems in the prior art.

The technical solution of this application is: a battery module, including a battery unit, a circuit board, and an expansion portion. The battery unit includes a first battery and a second battery. The first battery includes a first body and a first tab. The second battery includes a second body and a second tab. In a thickness direction of the first battery, the first battery is arranged alongside the second battery. A direction perpendicular to the thickness direction of the first battery is defined as a first direction. In the first direction, the battery unit includes a first end and a second end. The first tab protrudes from the first body at the first end, and the second tab protrudes from the second body at the first end. The circuit board is disposed at an outer side of the first end in the first direction. The first tab is connected to the circuit board, and the second tab is connected to the circuit board. The expansion portion is disposed between the first body and the second body and/or between the first tab and the second tab. The expansion portion is configured to disconnect the first tab and/or the second tab from the circuit board.

The expansion portion is disposed between the first body and the second body and/or between the first tab and the second tab. When the battery module generates excessive gas or heat, the expansion portion expands to exert an acting force between bodies or tabs of two adjacent batteries, thereby exerting an acting force between the first tab and/or the second tab and the circuit board to disconnect the first tab and/or the second tab from the circuit board. In this case, the battery module stops charging and discharging, thereby improving the safety performance of the battery module.

In an implementation, the expansion portion includes a capsule and a gassing material accommodated in the capsule. In an implementation, a thickness of the capsule is 100 µm to 1000 µm.

In an implementation, the capsule is made of a material including at least one selected from the group consisting of polyphenol or polyamide. The gassing material includes at least one selected from the group consisting of sodium nitride, calcium carbonate, magnesium carbonate, sodium carbonate, potassium carbonate, sodium bicarbonate, magnesium bicarbonate, potassium bicarbonate, or calcium bicarbonate.

The sodium nitride is an unstable alkali metal nitride expressed by a chemical formula of $Na_3N$, and can be easily hydrolyzed and decomposed. In an overcharging process of the battery module, the temperature of the battery unit rises. When the temperature rises to a value higher than 90° C., the $Na_3N$ solid is decomposed to produce nitrogen. The battery unit bursts open from top to disconnect the first tab and/or the second tab from the circuit board. The battery module is unable to continue charging and discharging, thereby reducing the risk brought by continued use of the battery module.

In an implementation, the expansion portion is located between the first body and the second body. The expansion portion includes a capsule and a foaming agent accommodated in the capsule. In an implementation, the capsule is made of a material including at least one selected from the group consisting of polypropylene or polyethylene. A thickness of the capsule is 50 µm to 500 µm.

In an implementation, the foaming agent includes a polyurethane foam sealing agent. When the battery module is used in harsh conditions, for example, in an overcharging process, the battery unit generates gas and expands, the pressure between the first battery and the second battery increases, and the capsule between the first body and the second body is crushed. The foaming agent in the capsule is exposed and contacts moisture in the air and expands, thereby exerting an acting force between the bodies or tabs of two adjacent batteries, and exerting an acting force between the first tab and/or the second tab and the circuit board to disconnect the first tab and/or the second tab from the circuit board. The battery module is unable to continue charging and discharging, thereby reducing the risk brought by continued use of the battery module.

In an implementation, in the thickness direction of the first battery, a projection of the first battery overlaps a projection of the second battery to form an overlap portion. A direction perpendicular to the thickness direction of the first battery and a direction perpendicular to the first direction are both defined as a second direction, and a projection of the expansion portion is disposed at a middle position of the overlap portion in the second direction. Arranged in this way, the expansion portion is subjected to a greater extrusion force at a position near the center, and the expansion force is also greater, thereby helping to disconnect the first tab and/or the second tab from the circuit board.

In an implementation, the battery module further includes a buffer disposed between the first body and the second body. In the first direction, the expansion portion is closer to the first end than the buffer.

In an implementation, in the thickness direction of the first battery, a projection of the expansion portion is connected to or separated from a projection of the buffer.

In an implementation, the battery module further includes a housing. The battery unit is disposed in the housing, and the circuit board is disposed between the first end and the housing.

This application further provides an electronic device. The electronic device includes the battery module described above.

In the battery module and the electronic device according to this application, the expansion portion is disposed between the first body and the second body and/or between the first tab and the second tab. The expansion portion expands when heated or compressed, thereby increasing an acting force between adjacent batteries and increasing an acting force between the tab and the circuit board. In this way, the first tab and/or the second tab are disconnected from the circuit board to stop charging or discharging, thereby reducing the risk brought by continued use of the battery module, and improving safety performance.

BRIEF DESCRIPTION OF THE DRAWINGS

The following describes this application in more detail with reference to drawings and specific embodiments.

REFERENCE NUMERALS OF MAIN COMPONENTS

Figure 1:
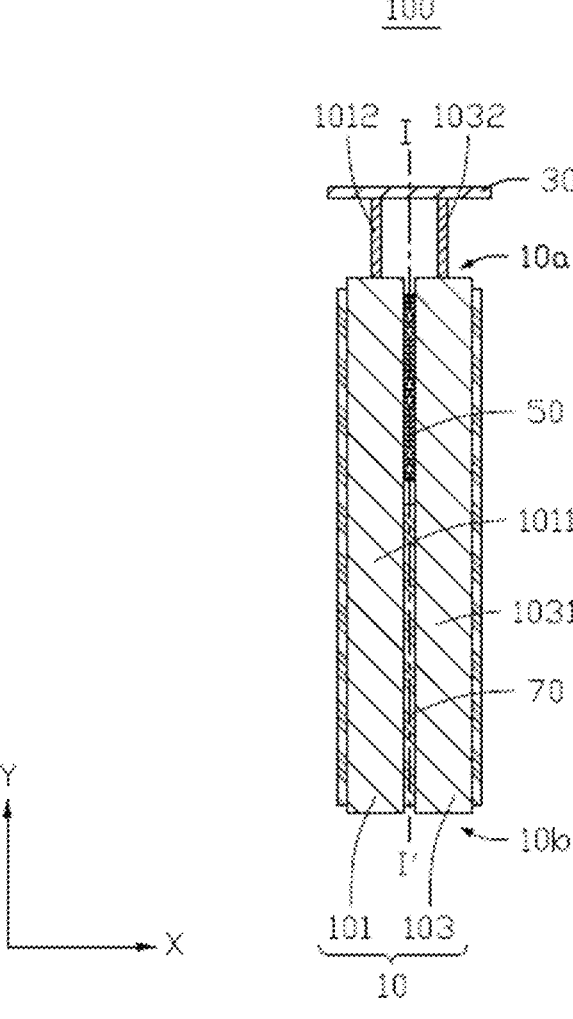
FIG. 1 is a front view of a battery module according to an embodiment of this application.

Battery module 100
Battery unit 10
Circuit board 30
Expansion portion 50
Buffer 70
Housing 90
First battery 101
Second battery 103
First end 10*a*
Second end 10*b*
First body 1011
First tab 1012
Third tab 1013
Second body 1031
Second tab 1032
Fourth tab 1033
Capsule 501, 502
Gassing material 503
Foaming agent 504
Overlap portion 110
Thickness direction X
First direction Y Second direction Z
The following further describes the embodiments of this application with reference to the drawings.

DETAILED DESCRIPTION

Unless otherwise defined, all technical and scientific terms used herein have the same meanings as what is usually understood by a person skilled in the art. The terms used herein are merely intended to describe specific embodiments but not to limit the embodiments of this application.

In addition, the terms such as "first" and "second" used herein are merely intended for ease of description, but not understood as indicating or implying priority or implicitly specifying the number of technical features mentioned. Therefore, a feature qualified by "first" or "second" may explicitly or implicitly include at least one such feature.

In this application, unless otherwise expressly specified and qualified, the terms such as "connection" and "fixing" need to be understood in a broad sense, for example, understood as a fixed connection or a detachable connection or understood as being integrated into a whole; or understood as a mechanical connection or an electrical connection, a direct connection or an indirect connection implemented through an intermediary; or understood as interior communication between two components or interaction between two components. A person of ordinary skill in the art understands the specific meanings of the terms in this application according to the context.

Figure 2:
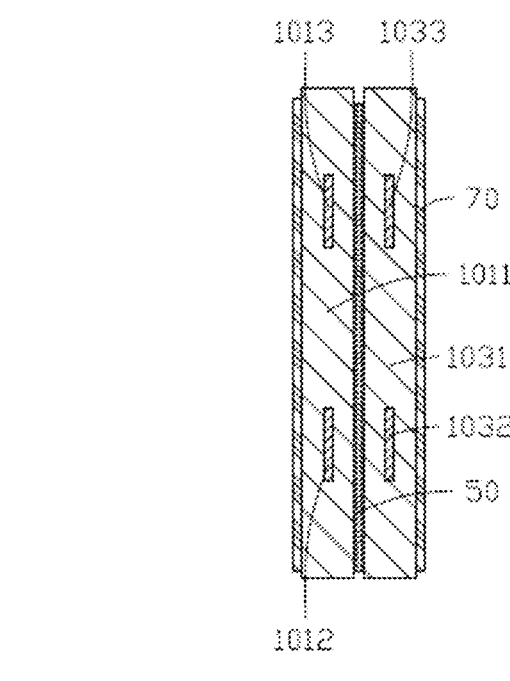
FIG. 2 is a top view of the battery module shown in FIG. 1.
Figure 3:
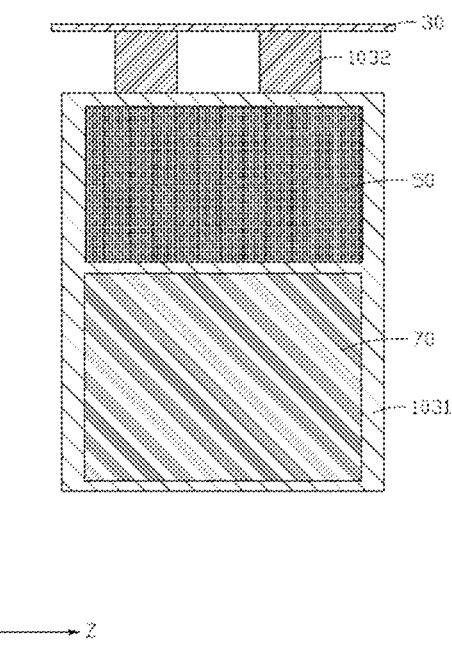
FIG. 3 is a schematic sectional view of the battery module shown in FIG. 1 and cross-sectioned along an I-I' line.

Referring to FIG. 1 to FIG. 3, this application provides a battery module 100, including a battery unit 10, a circuit board 30, and an expansion portion 50. The battery unit 10 includes a first battery 101 and a second battery 103. The first battery 101 includes a first body 1011 and a first tab 1012. The second battery 103 includes a second body 1031 and a second tab 1032. In a thickness direction X of the first battery 101, the first battery 101 is arranged alongside the second battery 103.

Understandably, in an implementation, the thickness direction X of the first battery 101 may be the thickness direction of the second battery 103. In an implementation, the thickness direction X of the first battery 101 may be the thickness direction of the battery unit 10.

A direction perpendicular to the thickness direction X of the first battery 101 is defined as a first direction Y In an implementation, the first direction Y may be a length direction of the first battery 101. A direction perpendicular to the thickness direction X and the first direction Y is defined as a second direction Z. In an implementation, the second direction Z may be a width direction of the first battery 101.

In the first direction Y, the battery unit 10 includes a first end 10*a* and a second end 10*b*. The first end 10*a* is shown as an upper end of the battery unit 10 in FIG. 1, and the second end 10*b* is shown as a lower end of the battery unit 10 in FIG. 1. The first tab 1012 protrudes from the first body 1011 at the first end 10*a*, and the second tab 1032 protrudes from the second body 1031 at the first end 10*a*.

The circuit board 30 is disposed at an outer side of the first end 10*a* in the first direction Y The first tab 1012 is connected to the circuit board 30, and the second tab 1032 is connected to the circuit board 30. Understandably, the circuit board 30 is configured to manage a charging and discharging process of the battery unit 10.

The expansion portion 50 is disposed between the first body 1011 and the second body 1031 and/or between the first tab 1012 and the second tab 1032. The expansion portion 50 is configured to disconnect the first tab 1012 and/or the second tab 1032 from the circuit board 30.

FIG. 1 shows a circumstance in which the battery unit 10 includes two batteries. Understandably, the battery unit 10 may include a plurality of batteries instead. When the battery unit 10 includes a plurality of batteries, the first battery 101 and the second battery 103 may be two adjacent batteries located at any positions.

As shown in FIG. 2, the first battery 101 further includes a third tab 1013, and the second battery 103 further includes a fourth tab 1033. An expansion portion 50 may be disposed between the third tab 1013 and the fourth tab 1033.

In an embodiment, the first tab 1012 and the third tab 1013 may be two homopolar tabs of the first battery 101. To be specific, both the first tab 1012 and the third tab 1013 may be positive or negative tabs of the first battery 101 concurrently. In an embodiment, the first tab 1012 and the third tab 1013 may be two heteropolar tabs of the first battery 101. To be specific, the first tab 1012 is a positive tab, and the third tab 1013 is a negative tab; or, the first tab 1012 is a negative tab, and the third tab 1013 is a positive tab.

Figure 4:
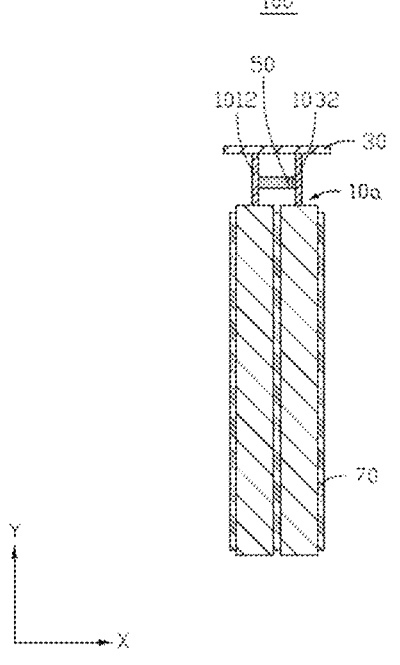
FIG. 4 is a front view of a battery module according to another embodiment of this application.
Figure 5:
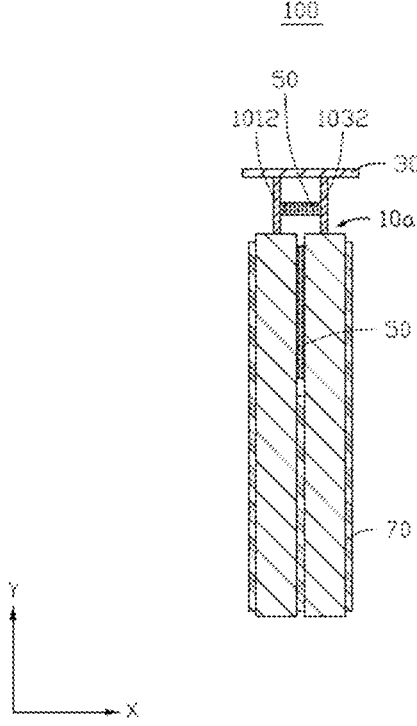
FIG. 5 is a front view of a battery module according to another embodiment of this application.

As shown in FIG. 1, the expansion portion 50 is disposed between the first body 1011 and the second body 1031. The expansion portion 50 may contact the first body 1011 and/or the second body 1031. As shown in FIG. 4, the expansion portion 50 may be disposed between the first tab 1012 and the second tab 1032. The expansion portion 50 may contact the first tab 1012 and/or the second tab 1032. As shown in FIG. 5, the expansion portion 50 may be disposed between the first body 1011 and the second body 1031, and between the first tab 1012 and the second tab 1032, concurrently.

Figure 6:
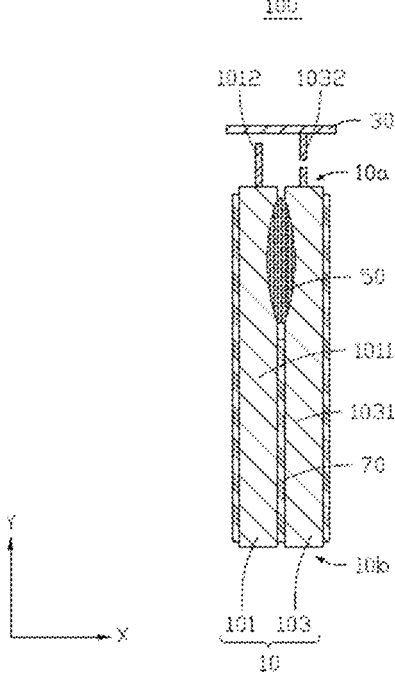
FIG. 6 is a schematic diagram of an expansion portion disconnecting a first tab and/or a second tab from a circuit board according to an embodiment of this application.

As shown in FIG. 6, when the battery module 100 is used in harsh conditions, for example, in an overcharging process, gas or heat generated to some extent causes the expansion portion 50 to expand. The expansion increases the acting force between the first battery 101 and the second battery 103, and increases the acting force between the first tab 1012 and/or the second tab 1032, thereby disconnecting the first tab 1012 and/or the second tab 1032 from the circuit board 30. Therefore, the battery module stops charging and discharging, thereby alleviating the problems such as overcharging of the battery module and improving safety performance. Understandably, the disconnection of the first tab 1012 and/or the second tab 1032 from the circuit board 30 includes: fracture at a joint between the first tab 1012 and/or the second tab 1032 and the circuit board 30, and fracture of the first tab 1012 and/or the second tab 1032 itself.

Figure 7:
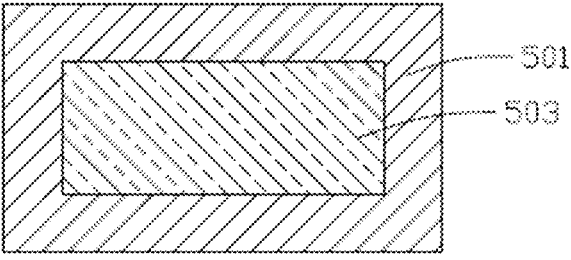
FIG. 7 is a schematic diagram of an expansion portion according to an embodiment of this application.

As shown in FIG. 7, the expansion portion 50 includes a capsule 501 and a gassing material 503 accommodated in the capsule 501. Further, a thickness of the capsule 501 is 100 μm to 1000 μm. Further, the capsule 501 is made of a material including at least one selected from the group consisting of polyphenol or polyamide. The gassing material 503 includes at least one selected from the group consisting of sodium nitride, calcium carbonate, magnesium carbonate, sodium carbonate, potassium carbonate, sodium bicarbonate, magnesium bicarbonate, potassium bicarbonate, or calcium bicarbonate. Further, an inner layer of the capsule 501 is coated with a polymer such as polychloroprene to achieve airtightness.

The sodium nitride is an unstable alkali metal nitride expressed by a chemical formula of $Na_3N$, and can be easily hydrolyzed and decomposed. In an overcharging process of the battery module, the temperature of the battery unit 10 rises. When the temperature rises to a value higher than 90° C., the $Na_3N$ solid is decomposed to produce nitrogen to generate an extrusion force greater than 160 N. The circuit board 30 is connected to the first tab 1012 and the second tab 1032 by laser welding with a welding tension of approximately 100 N. The tension required for tearing off the first tab 1012 and the second tab 1032 itself is 80 N to 160 N. The extrusion force of the gas generated by the thermally decomposed gassing material is greater than 160 N, and therefore, can disconnect the first tab 1012 and/or the second tab 1032 from the circuit board 30, making the battery module unable to continue charging and discharging, thereby reducing the risk brought by continued use of the battery module.

The gassing principle of the gassing material is thermal decomposition. Understandably, when the gassing material 503 is accommodated in the capsule 501, the expansion portion 50 may be disposed between the first body 1011 and the second body 1031; or, disposed between the tabs, that is, between the first tab 1012 and the second tab 1032, or between the third tab 1013 and the fourth tab 1033. When the expansion portion 50 is disposed between the first body 1011 and the second body 1031, the heating area is large. When the expansion portion 50 is disposed between the first tab 1012 and the second tab 1032, or between the third tab 1013 and the fourth tab 1033, the heat transfer speed is high because the tabs are generally made of a metal material.

Figure 8:
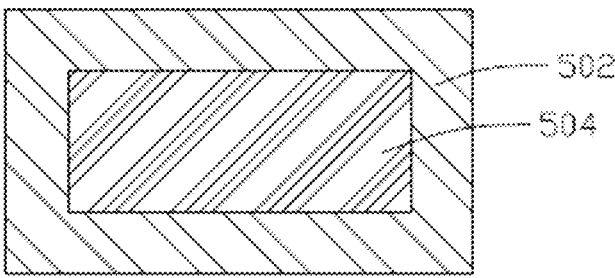
FIG. 8 is a schematic diagram of an expansion portion according to another embodiment of this application.

As shown in FIG. 8, the expansion portion 50 includes a capsule 502 and a foaming agent 504 accommodated in the capsule 502. Further, the capsule 502 is made of a material including at least one selected from the group consisting of polypropylene or polyethylene. The thickness of the capsule 502 is 50 μm to 500 μm. Further, the foaming agent 504 includes a polyurethane foam sealing agent. The polyurethane foam sealing agent is a special polyurethane product produced from a polyurethane prepolymer, a foaming agent, a crosslinking agent, a catalyst, and the like. When contacting the moisture in the air, the foamy polyurethane material expands quickly and undergoes a solidification reaction to form foam, and possesses the advantage of high expansivity. Foaming agents include calcium carbonate, sodium bicarbonate, and the like. Crosslinking agents include polyol, divinylbenzene, and the like. Catalysts include triethylene diamine, and the like.

When the battery module 100 is used in harsh conditions, for example, in an overcharging process, the battery unit 10 generates gas, and the pressure between the first battery 101 and the second battery 103 increases. The capsule 502 between the first body 1011 and the second body 1031 is crushed. The foaming agent contacts the moisture in the air and expands to disconnect the first tab 1012 and/or the second tab 1032 from the circuit board 30. The battery module 100 is unable to continue charging and discharging, thereby reducing the risk brought by continued use of the battery module 100. Understandably, when the foaming agent 504 is accommodated in the capsule 502, the capsule 502 needs to be crushed, the expansion portion 50 is preferably disposed between the first body 1011 and the second body 1031.

Figure 9:
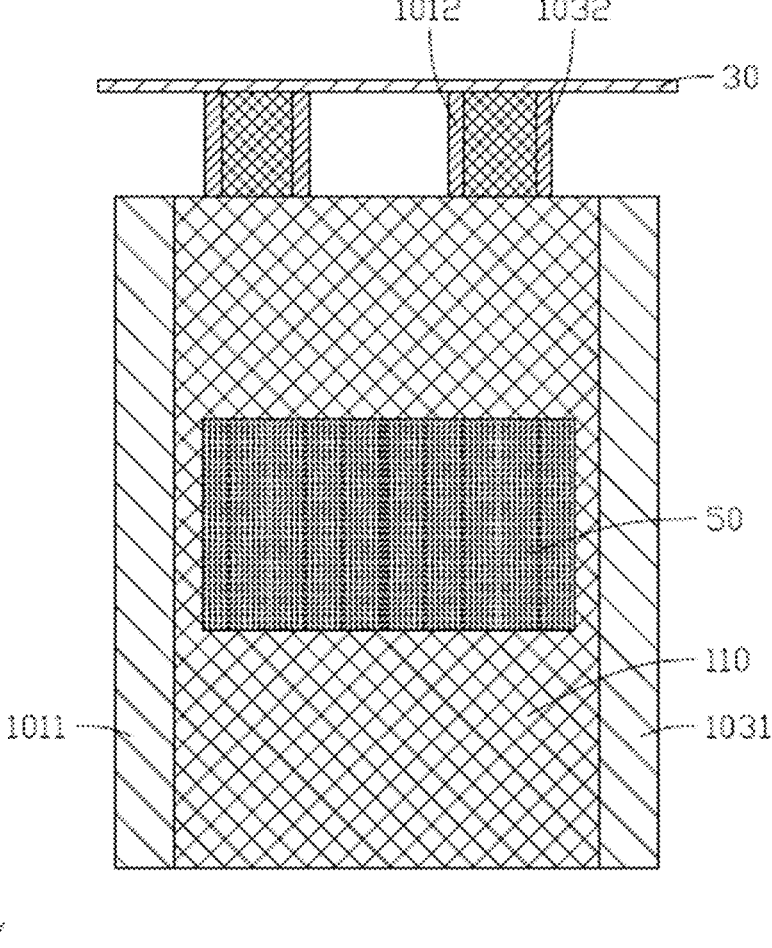
FIG. 9 is a schematic diagram of projections of a first battery, a second battery, and an expansion portion in a thickness direction X according to an embodiment of this application.

As shown in FIG. 9, in the thickness direction X of the first battery 101, a projection of the first battery 101 overlaps a projection of the second battery 103 to form an overlap portion 110. A projection of the expansion portion 50 is disposed at a middle position of the overlap portion 110 in the second direction Z. Arranged in this way, the expansion portion 50 is subjected to a greater extrusion force at a position near the center, and the expansion force is also greater, thereby helping to disconnect the first tab 1012 and/or the second tab 1032 from the circuit board 30. Further, in the thickness direction X, the projection of the first body 1011 at least partly overlaps the projection of the second body 1031, and the projection of the first tab 1012 at least partly overlaps the projection of the second tab 1032.

Figure 10:
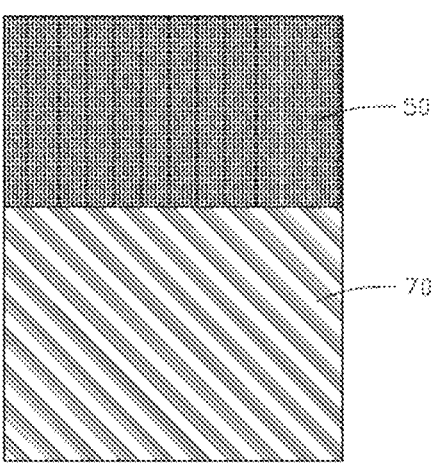
FIG. 10 is a schematic diagram of projections of an expansion portion and a buffer in a thickness direction X according to an embodiment of this application.
Figure 10:
Figure 11:
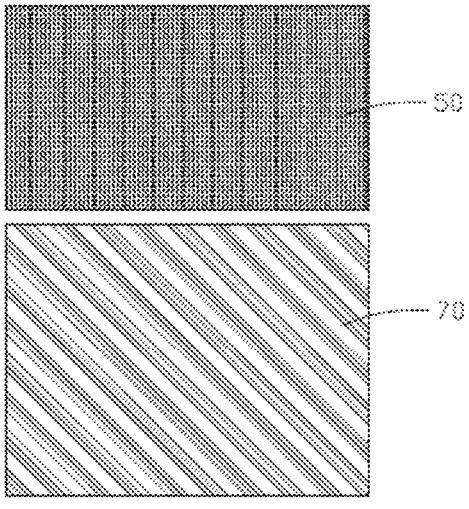
FIG. 11 is a schematic diagram of projections of an expansion portion and a buffer in a thickness direction X according to another embodiment of this application.
Figure 11:

Still referring to FIG. 1, the battery module 100 further includes a buffer 70 disposed between the first body 1011 and the second body 1031. In the first direction X, the expansion portion 50 is closer to the first end 10$a$ than the buffer 70. When a cell expands, the buffer 70 can buffer the extrusion force between the batteries. The buffer 70 is preferably foam. As shown in FIG. 10, in the thickness direction X of the first battery 101, the projection of the expansion portion 50 is connected to, that is, directly concatenated to but without overlapping with, the projection of the buffer 70. As shown in FIG. 3 and FIG. 11, in the thickness direction X of the first battery 101, the projection of the expansion portion 50 is separated from the projection of the buffer 70.

Figure 12:
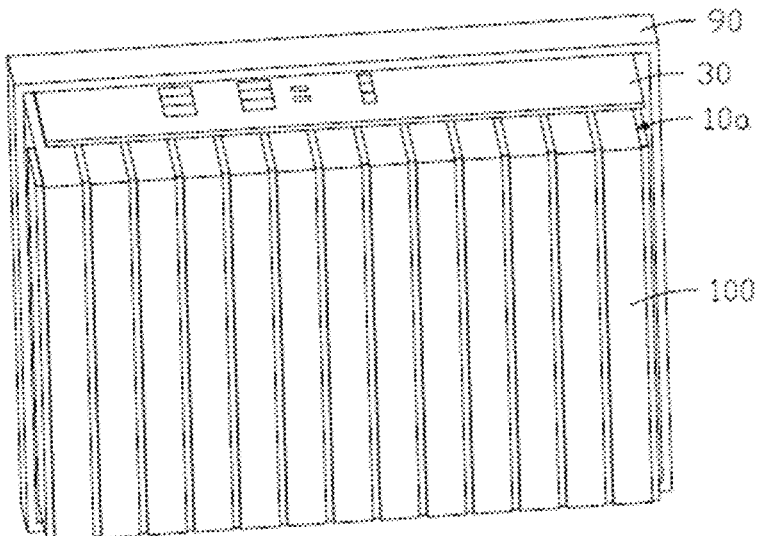
FIG. 12 is a schematic diagram of a battery module according to another embodiment of this application.
Figure 12:

As shown in FIG. 12, the battery module 100 further includes a housing 90. The battery unit 10 and the circuit board 30 are disposed in the housing 90. In an implementation, the circuit board 30 is disposed between the first end 10$a$ and the housing 90. In an implementation, the buffer 70 is disposed between the first battery 101 and/or the second battery 103 and the housing 90.

The following further describes this application with reference to specific embodiments.

Embodiment 1

As shown in FIG. 1, a first battery 101 and a second battery 103 are stacked together with a buffer 70. The buffer 70 is foam. A part of the foam between the first body 1011 of the first battery 101 and the second body 1031 of the second battery 103 is cut away and replaced with an expansion portion 50. Specifically, the expansion portion 50 is a capsule 501 containing a gassing material 503. The gassing material 503 is Na$_3$N. The capsule 501 is made of polyphenol, and the inner layer is coated with a polychloroprene polymer to achieve airtightness. The thickness of the capsule 501 is 300 μm. The stacked parts are welded to a circuit board 30, and then loaded into a housing 90 to form a battery module 100 shown in FIG. 12. An overcharge test is performed on the battery module 100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Embodiment 2

This embodiment differs from Embodiment 1 in that the capsule 501 is made of polyamide. Other settings are the same as those in Embodiment 1, and are omitted here. An overcharge test is performed on the prepared battery module 100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Embodiment 3

This embodiment differs from Embodiment 1 in that the thickness of the capsule 501 is 200 μm. Other settings are the same as those in Embodiment 1, and are omitted here. An overcharge test is performed on the prepared battery module

100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Embodiment 4

This embodiment differs from Embodiment 1 in: the expansion portion 50 is a capsule 502 containing a foaming agent 504, where the foaming agent 504 includes polyurethane foam sealing agent; the capsule 502 is made of polyethylene (PE); and the thickness of the capsule 502 is 100 μm. Other settings are the same as those in Embodiment 1, and are omitted here. An overcharge test is performed on the prepared battery module 100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Embodiment 5

This embodiment differs from Embodiment 1 in: the expansion portion 50 is a capsule 502 containing a foaming agent 504, where the foaming agent 504 includes polyurethane foam sealing agent; the capsule 502 is made of polypropylene (PP); and the thickness of the capsule 502 is 200 μm. Other settings are the same as those in Embodiment 1, and are omitted here. An overcharge test is performed on the prepared battery module 100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Embodiment 6

This embodiment differs from Embodiment 1 in: the expansion portion 50 is a capsule 502 containing a foaming agent 504, where the foaming agent 504 includes polyurethane foam sealing agent; the capsule 502 is made of polypropylene (PP); and the thickness of the capsule is 500 μm. Other settings are the same as those in Embodiment 1, and are omitted here. An overcharge test is performed on the prepared battery module 100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Embodiment 7

This embodiment differs from Embodiment 6 in that the thickness of the capsule 502 is 10 μm. Other settings are the same as those in Embodiment 6, and are omitted here. In the manufacturing process, the capsule 502 is ruptured in advance, and the foaming agent 504 foams in advance, so that the connection between the tab and the circuit board 30 can be cut off.

Embodiment 8

A first battery 101 and a second battery 103 are stacked together with a buffer 70. The buffer 70 is foam. The stacked parts are welded to a circuit board 30. The first battery 101 contains a first tab 1012, and the second battery contains a second tab 1032. After welding, an expansion portion 50 is disposed between the first tab 1012 and the second tab 1032. The expansion portion 50 is a capsule 501 containing a gassing material 503. The gassing material 503 is $Na_3N$. The capsule 501 is made of polyphenol, and the inner layer is coated with a polychloroprene polymer to achieve airtightness. The thickness of the capsule is 200 μm. The battery module 100 is loaded into the housing 90 to form a battery module 100. An overcharge test is performed on the battery module 100. The test result is: The top of the battery module 100 is burst open, the connection between the first tab 1012 and the second tab 1032 and the circuit board 30 is broken, the battery module 100 stops charging, and the battery module 100 neither catches fire nor explodes, and passes the overcharge test.

Comparative Embodiment 1

In Comparative Embodiment 1, a plurality of batteries are stacked together with foam. The stacked parts are welded to a circuit board 30, and loaded into a housing 90 to form a battery module 100. An overcharge test is performed on the battery module 100. The test result is: The top of the battery module 100 is not burst open, the connection between the first tab 1012 and the second tab 1032 and the circuit board 30 is not broken, the battery module 100 continues charging, and the battery module 100 is thermally runaway and fails the overcharge test.

Table 1 shows the settings and test results of each embodiment and each comparative embodiment.

and an appropriate capsule material and an appropriate capsule thickness are selected. The battery module in Embodiment 8 can pass the overcharge test. Comparative Embodiment 1 fails the overcharge test because no expansion portion is disposed. In Embodiment 7, the capsule is ruptured in advance due to a small thickness of the capsule, but the thickness of the capsule in Embodiments 4 to 6 is within an appropriate range.

In the battery module and the electronic device according to this application, the expansion portion is disposed between the first body and the second body and/or between the first tab and the second tab. The expansion portion expands when heated or compressed, so that the first tab and/or the second tab are disconnected from the circuit board to stop charging or discharging, thereby reducing the risk brought by continued use of the battery module.

What is claimed is:

1. A battery module, comprising:
   a battery unit comprising a first battery and a second battery; wherein the first battery comprises a first body and a first tab; the second battery comprises a second body and a second tab; and in a thickness direction of the first battery, the first battery is arranged alongside the second battery;
   wherein a direction perpendicular to the thickness direction of the first battery is defined as a first direction; and in the first direction, the battery unit comprises a first end and a second end opposite to the first end; and the first tab protrudes from the first body at the first end, and the second tab protrudes from the second body at the first end;

TABLE 1

| | Location of expansion portion | Material accommodated in capsule | Material for preparing capsule | Thickness of capsule (μm) | Test results |
|---|---|---|---|---|---|
| Embodiment 1 | Between the first body and the second body | Gassing material | Polyphenol | 300 | Pass |
| Embodiment 2 | Between the first body and the second body | Gassing material | Polyamide | 300 | Pass |
| Embodiment 3 | Between the first body and the second body | Gassing material | Polyphenol | 200 | Pass |
| Embodiment 4 | Between the first body and the second body | Foaming agent | Polyethylene | 100 | Pass |
| Embodiment 5 | Between the first body and the second body | Foaming agent | Polypropylene | 200 | Pass |
| Embodiment 6 | Between the first body and the second body | Foaming agent | Polypropylene | 500 | Pass |
| Embodiment 7 | Between the first body and the second body | Foaming agent | Polypropylene | 10 | Capsule is ruptured in advance |
| Embodiment 8 | Between the first tab and the second tab | Gassing material | Polyphenol | 200 | Pass |
| Comparative Embodiment 1 | None | None | None | None | Fail |

In Embodiments 1 to 3, an expansion portion containing a gassing material is disposed between the first body and the second body, and an appropriate capsule material and an appropriate capsule thickness are selected. All battery modules can pass the overcharge test. In Embodiments 4 to 7, an expansion portion containing a foaming agent is disposed between the first body and the second body, so that the connection between the tab and the circuit board can be cut off. All battery modules can pass the overcharge test. In Embodiment 8, an expansion portion containing a gassing material is disposed between the first tab and the second tab, a circuit board disposed at an outer side of the first end in the first direction, the first tab is connected to the circuit board, and the second tab is connected to the circuit board; and an expansion portion comprising a capsule portion surrounding a gaseous material, the expansion portion disposed between the first body and the second body and/or between the first tab and the second tab, and the expansion portion is configured such that the gaseous material expands under at least one of heat or compression to exert a force between the first body and the second body and/or between the first tab and the second tab to disconnect the first tab and/or the second tab from the circuit board, wherein the capsule is made of a material comprising at least one selected from the group consisting of polyphenol or polyamide.

2. The battery module according to claim 1, wherein the gaseous material comprises at least one selected from the group consisting of sodium nitride, calcium carbonate, magnesium carbonate, sodium carbonate, potassium carbonate, sodium bicarbonate, magnesium bicarbonate, potassium bicarbonate, or calcium bicarbonate.

3. The battery module according to claim 1, wherein a thickness of the capsule is 100 μm to 1000 μm.

4. The battery module according to claim 1, further comprising a buffer disposed between the first body and the second body, and in the first direction, the expansion portion is closer to the first end than the buffer.

5. The battery module according to claim 4, wherein, in the thickness direction of the first battery, a projection of the expansion portion is separated from a projection of the buffer.

6. The battery module according to claim 1, further comprising a housing, the battery unit is disposed in the housing, and the circuit board is disposed between the first end and the housing.

7. A battery module comprising:

a battery unit comprising a first battery and a second battery; wherein the first battery comprises a first body and a first tab; the second battery comprises a second body and a second tab; and in a thickness direction of the first battery, the first battery is arranged alongside the second battery;

wherein a direction perpendicular to the thickness direction of the first battery is defined as a first direction; and in the first direction, the battery unit comprises a first end and a second end opposite to the first end; and the first tab protrudes from the first body at the first end, and the second tab protrudes from the second body at the first end;

a circuit board disposed at an outer side of the first end in the first direction, the first tab is connected to the circuit board, and the second tab is connected to the circuit board; and an expansion portion located between the first body and the second body, and the expansion portion comprises a capsule and a foaming agent accommodated in the capsule, and the expansion portion is configured such that the capsule is crushed and the foaming agent expands under at least one of heat or compression to exert a force between the first body and the second body and/or between the first tab and the second tab to disconnect the first tab and/or the second tab from the circuit board, wherein the capsule is made of a material comprising at least one selected from the group consisting of polypropylene or polyethylene.

8. The battery module according to claim 7, wherein the foaming agent comprises a polyurethane foam sealing agent.

9. The battery module according to claim 7, wherein a thickness of the capsule is 50 μm to 500 μm.

10. The battery module according to claim 7, wherein in the thickness direction of the first battery, a projection of the first battery overlaps a projection of the second battery to form an overlap portion; and a direction perpendicular to the thickness direction of the first battery and the first direction is defined as a second direction, and a projection of the expansion portion is disposed at a middle position of the overlap portion in the second direction.

11. An electronic device, comprising a battery module; wherein the battery module comprises:

a battery unit comprising a first battery and a second battery; wherein the first battery comprises a first body and a first tab; the second battery comprises a second body and a second tab; and in a thickness direction of the first battery, the first battery and the second battery are arranged alongside;

wherein a direction perpendicular to the thickness direction of the first battery is defined as a first direction; and in the first direction, the battery unit comprises a first end and a second end opposite to the first end; and the first tab protrudes from the first body at the first end, and the second tab protrudes from the second body at the first end;

a circuit board disposed at an outer side of the first end in the first direction, the first tab is connected to the circuit board, and the second tab is connected to the circuit board; and an expansion portion comprising a capsule portion surrounding a gaseous material, the expansion portion disposed between the first body and the second body and/or between the first tab and the second tab, and the expansion portion is configured such that the gaseous material expands under at least one of heat or compression to exert a force between the first body and the second body and/or between the first tab and the second tab to disconnect the first tab and/or the second tab from the circuit board, wherein the capsule is made of a material comprising at least one selected from the group consisting of polyphenol or polyamide.

12. The electronic device according to claim 11, wherein the gaseous material comprises at least one selected from the group consisting of sodium nitride, calcium carbonate, magnesium carbonate, sodium carbonate, potassium carbonate, sodium bicarbonate, magnesium bicarbonate, potassium bicarbonate, or calcium bicarbonate.

13. The electronic device according to claim 11, wherein a thickness of the capsule is 100 μm to 1000 μm.

14. The electronic device according to claim 11, wherein the battery module further comprises a buffer disposed between the first body and the second body, and in the first direction, the expansion portion is closer to the first end than the buffer.

15. An electronic device comprising:

a battery unit comprising a first battery and a second battery; wherein the first battery comprises a first body and a first tab; the second battery comprises a second body and a second tab; and in a thickness direction of the first battery, the first battery and the second battery are arranged alongside;

wherein a direction perpendicular to the thickness direction of the first battery is defined as a first direction; and in the first direction, the battery unit comprises a first end and a second end opposite to the first end; and the first tab protrudes from the first body at the first end, and the second tab protrudes from the second body at the first end;

a circuit board disposed at an outer side of the first end in the first direction, the first tab is connected to the circuit board, and the second tab is connected to the circuit board; and an expansion portion is located between the first body and the second body, and the expansion portion comprises a capsule and a foaming agent accommodated in the capsule, and the expansion portion is configured such that the capsule is crushed and the foaming agent expands under at least one of heat or compression to exert a force between the first body and the second body and/or between the first tab and the second tab to disconnect the first tab and/or the second tab from the circuit board, wherein the capsule is made of a material comprising at least one selected from the group consisting of polypropylene or polyethylene.

16. The electronic device according to claim 15, wherein the foaming agent comprises a polyurethane foam sealing agent.

17. The electronic device according to claim 15, wherein a thickness of the capsule is 50 µm to 500 µm.

18. The electronic device according to claim 15, wherein in the thickness direction of the first battery, a projection of the first battery overlaps a projection of the second battery to form an overlap portion; and a direction perpendicular to the thickness direction of the first battery and the first direction is defined as a second direction, and a projection of the expansion portion is disposed at a middle position of the overlap portion in the second direction.

* * * * *